(12) United States Patent
Daniel et al.

(10) Patent No.: US 10,452,366 B2
(45) Date of Patent: Oct. 22, 2019

(54) METHOD AND TOOL FOR ENGINEERING SOFTWARE ARCHITECTURES WITH ITS VARIOUS SOFTWARE ARTIFACTS OF COMPLEX CYBER-PHYSICAL SYSTEMS OF DIFFERENT TECHNICAL DOMAINS

(71) Applicant: Siemens Aktiengesellschaft, Munich (DE)

(72) Inventors: Donny Thomas Daniel, Unterhaching (DE); Egon Wuchner, Biessenhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 441 days.

(21) Appl. No.: 15/303,340

(22) PCT Filed: Apr. 13, 2015

(86) PCT No.: PCT/EP2015/057983
§ 371 (c)(1),
(2) Date: Oct. 11, 2016

(87) PCT Pub. No.: WO2015/158663
PCT Pub. Date: Oct. 22, 2015

(65) Prior Publication Data
US 2017/0031663 A1     Feb. 2, 2017

(30) Foreign Application Priority Data

Apr. 15, 2014 (EP) .................................... 14164745

(51) Int. Cl.
*G06F 9/44* (2018.01)
*G06F 8/41* (2018.01)
(Continued)

(52) U.S. Cl.
CPC ................ *G06F 8/433* (2013.01); *G06F 8/36* (2013.01); *G06F 8/76* (2013.01)

(58) Field of Classification Search
CPC .......... G06F 8/71; G06F 9/44505; G06F 8/20; G06F 8/61; G06F 8/36
(Continued)

(56) References Cited

U.S. PATENT DOCUMENTS

| 7,743,074 B1 | 6/2010 | Parupudi et al. ............. 707/802 |
| 2004/0049565 A1 | 3/2004 | Keller et al. .................. 709/223 |

(Continued)

FOREIGN PATENT DOCUMENTS

| CN | 1585942 A | 2/2005 | ............. G06F 17/30 |
| CN | 1682196 A | 10/2005 | ............. G06F 11/07 |

(Continued)

OTHER PUBLICATIONS

Mackinlay, J.D., "Automating the Design of Graphical Presentations of Relational Information," ACM Transactions on Graphics, 35 pages, 1986.

(Continued)

*Primary Examiner* — Chuck O Kendall
(74) *Attorney, Agent, or Firm* — Slayden Grubert Beard PLLC

(57) ABSTRACT

In order to give architects engineering the software of software architectures with its various software artifacts of complex cyber-physical systems of different technical domains a powerful way to identify and control architecture erosion in codebases of the complex cyber-physical systems, a method or tool is provided that may (i) diagnose and categorize software artifacts dependencies in the software architectures of complex cyber-physical systems triggered by revisions or commits, (ii) relate changes in the diagnosed and categorized dependencies with change events on the
(Continued)

software artifacts, e.g., those caused by at least one of enhancing the complex cyber-physical system with new features as required by market demands and fixing defects found in operation and/or raised during maintenance of the complex cyber-physical system, and (iii) represent the diagnosed and categorized dependencies and the related changes in the diagnosed and categorized dependencies.

19 Claims, 6 Drawing Sheets

(51) Int. Cl.
　　*G06F 8/36*　　　　(2018.01)
　　*G06F 8/76*　　　　(2018.01)
(58) Field of Classification Search
　　USPC ......................................................... 717/121
　　See application file for complete search history.

(56) References Cited

U.S. PATENT DOCUMENTS

| | | | |
|---|---|---|---|
| 2005/0091227 A1 | 4/2005 | Mccollum et al. | |
| 2006/0010425 A1 | 1/2006 | Willadsen et al. | 717/120 |

FOREIGN PATENT DOCUMENTS

| | | | | |
|---|---|---|---|---|
| CN | 1836208 A | 9/2006 | ............ | G06F 12/00 |
| WO | 2015/158663 A1 | 10/2015 | ............... | G06F 9/44 |
| WO | WO 2015158663 A1 * | 10/2015 | ............ | G06F 8/433 |

OTHER PUBLICATIONS

Lakos, John, "Large-Scale C++ Software Design," Addison-Wesley Publishing Company, pp. 312-234, 1996.

Holt, Richard C., "Structural Manipulations of Software Architecture Using Tarski Relational Algebra," 5th Working Conference on Reverse Engineering, 10 pages, Oct. 12, 1998.

Bruls, Mark et al., "Squarified Treemaps," Data Visualization, pp. 33-42, 2000.

Sugiyama, Kozo, "Graph Drawing and Applications for Software and Knowledge Engineers," World Scientific, vol. 11, pp. 64-65, 2002.

"Creole," The CHISEL Group, University of Victoria, B.C., URL: http://thechiselgroup.org/2003/07/06/shrimp-views/, 3 pages, Jul. 6, 2003.

Froehlich, Jon et al., "Unifying Artifacts and Activities in a Visual Tool for Distributed Software Development Teams," Proceedings; 26th International Conference on Software Engineering, IEEE, pp. 387-396, 2004.

"NDepend metrics," URL: http://www.hanselman.com/blog/content/binary/NDepend%20metrics%20placemats%201.1.pff, 1 page, 2007.

Bildhauer, Daniel et al., "Querying Software Abstraction Graphs," Working on Query Technologies and Applications for Program Comprehension, 4 pages, 2008.

Dwyer, Tim, "Scalable, Versatile, and Simple Constrained Graph Layout," Computer Graphics Forum, vol. 28, No. 3, pp. 991-998, 2009.

"ISO/IEC/IEEE 42010, Systems and Software Engineering—Architecture Description," IEEE, 46 pages, Dec. 1, 2011.

"Measuring Complexity," URL: http://structure101.com/products/, 7 pages, 2014.

"Lattix Architect and Lattix Analyst," URL: http://www.lattix.com/, 2 pages, 2014.

"Eclipse," Zest, The Eclipse Foundation, URL: http://www.eclipse.org/gef/zest/index.php, 2 pages, 2014.

"Graphviz—Graph Visualization Software," URL: http://www.graphviz.org/, 1 pages, 2014.

"Netty Project," URL: http://github.com/netty/netty/, 4 pages, 2014.

"Poster nDepend," URL: http://www.ndepend.com/, 1 pages, 2014.

International Search Report and Written Opinion, Application No. PCT/EP2015/057963, 8 pages, dated May 29, 2015.

Chinese Office Action, Application No. 201580020236.4, 8 pages, dated Mar. 5, 2019.

* cited by examiner

METHOD AND TOOL FOR ENGINEERING SOFTWARE ARCHITECTURES WITH ITS VARIOUS SOFTWARE ARTIFACTS OF COMPLEX CYBER-PHYSICAL SYSTEMS OF DIFFERENT TECHNICAL DOMAINS

CROSS-REFERENCE TO RELATED APPLICATIONS

This application is a U.S. National Stage Application of International Application No. PCT/EP2015/057983 filed Apr. 13, 2015, which designates the United States of America, and claims priority to EP Application No. 14164745.3 filed Apr. 15, 2014, the contents of which are hereby incorporated by reference in their entirety.

TECHNICAL FIELD

The invention refers to a method and tool for engineering or maintaining software architectures with its various software artifacts of complex cyber-physical systems of different technical domains.

BACKGROUND

The term "engineering" used in the following implicates all possible actions in the context of software architectures of complex cyber-physical systems used in different technical domains, such as the maintaining of software architecture of complex cyber-physical systems.

The term "cyber-physical system" used in the following refers to a system of collaborating computational elements controlling physical entities (cf. http://en.wikipedia.org/wiki/Cyber-physical system in the version of Jul. 23, 2014), whereby the technical domains could be as diverse as areas like aerospace, automotive, chemical processes, civil infrastructure, energy, healthcare, manufacturing, transportation, entertainment, consumer appliances etc. and include technical capital and/or producer goods.

The term "software architectures" used in the following refers to a high level structure of a software system, the discipline of creating such a high level structure, and the documentation of this structure (cf. http://en.wikipedia.org/wiki/Software architecture in the version of Jul. 24, 2014). Thus, when in the following the term "software architectures" is used all software structures of complex cyber-physical systems of different technical domains should be covered.

The architectural aspects of a large and complex cyber-physical system are typically captured in a large number of system models called "Views".

With regard to such a method or tool it is known the following:

I. Low-level Graph Rendering

Low-level drawing and layout toolkits, like "Graphviz" in [1], and libraries, like "Eclipse Zest" in [2], help the user to render information visually as graphs with nodes and edges. However, the default output of these tools is often not categorized and requires lots of customization to get the desired results.

"Graphviz" only knows about nodes and edges and relies on the user to give directions regarding the grouping of nodes and their placement. "Graphviz" supports generic layout algorithms like "dot", which is a tool. It is up to the user to design his own visualization using the lower level building blocks that "Graphviz" provides. In addition, "Graphviz" is only a renderer and cannot support interactive usage. Libraries like "Eclipse Zest" allow the user to create interactive renderings; however, the user still has to design the representation that is pertinent to the problem.

II. Levelization Algorithm

The basic levelization algorithm of determining levels for dependencies was first described by "John Lakos" in [3]. Levelization assigns a number to each software artifact based on its dependencies. Components external to the system are level 0, system components which do not have any dependencies are level 1. Components which depend on level 1 components are considered level 2 and so on. However, an explicit representation of the result of the analysis is not prescribed.

In a cheat sheet describing "NDepend implementation of the levelization algorithm" in [4], an illustrative representation is found.

This representation visually separates layered, tangled and third-party artifacts, but does not offer facilities like grouping to manage large diagrams. It also doesn't specify any interactive adaptations to make the diagnosis more efficient. In contrast, it explicitly addresses scaling the representation for real-world scenarios, while also extending the basic representation to support software evolution information.

III. Hierarchical Views

The "Simple Hierarchical Multi-Perspective (SHriMP)"—tool according to [5] showing composite edges and nested nodes allows users to view complex information spaces software dependencies and knowledge bases. The tool provides hierarchical views that allow the user to drill down and explore complex graphs. The user can toggle the layouts used to render the nodes, e.g. use a Tree Layout or Grid Layout. The edges can also be aggregated to composite edges that are easier to give an overview of. However, it does not support software evolution information, partitioning of the nodes into categories according to criteria, cycle detection and more importantly the levelized view of the nodes.

The Levelized Structure Map (LSM) from "Structure101" in [6] is also a hierarchical view of software dependencies. The LSM supports identifying cycles of dependencies and can do layer analysis regarding architectural constraints.

An additional graph view provided by "Structure101" is showing graph diagrams that are clustered generically by the cycles in dependencies (Showing Tangles In Dependencies). However, these views do not support an evolution view that relates maintenance events for a more comprehensive understanding of why such a tangled dependency was introduced.

Integrated Development Environments (IDEs) like Visual Studio and Eclipse also have plugins that also provide similar views but they suffer the same limitations.

IV. Dependency Structure Matrices

Popular commercial tools like "Lattix" according to [7] and "NDepend" according to [8] rely on a visualization based on the Dependency Structured Matrix. The entities under consideration are placed in an n x n matrix, with cells that are used to indicate dependency information. For example, if an entity i, depends on entity j, then the cell (i,j) could be filled in with a special mark, or some metric that represents the number of dependencies.

With sufficient training, a user can interpret large graphs of dependencies. However, they are not as comprehensible as node and edge diagrams, and also don't convey software evolution information.

For engineering or maintaining software architectures/structures of software systems with its various software artifacts it should be considered the following:

(A) Huge Amount of Dependencies in Software Systems

A majority of the efforts (and hence, cost) during a software product's lifecycle goes to maintaining the software: enhancing the software system with new features as required by market demands and fixing defects found in operation. The maintainability of a software product is directly influenced by the manner in which various software artifacts like subsystems, components, packages and classes depend on each other. Each tightly coupled artifact is hard to be replaced or be relocated to other locations of the overall software system structure. If a system has several artifacts that are tightly coupled together, making a change in one artifact can cause a cascading change in the directly depended artifacts. This leads to increased compile and link times, larger regression tests to be performed, extended time to comprehend the overall structure and implications of a change, hence leading to increases of engineering time and higher maintenance costs.

(B) Information Overload Due to Automated Extraction of Dependencies

It is possible to use automated methods to extract dependency information from software artifacts. However, the amount of information collected is very large, and cannot be understood in the raw form. The amount of data has to be presented in a scoped manner in order to avoid overwhelming the user.

(C) Lacking Information About the Relation with Other Evolution Information

Dependency relations alone are often not enough in answering questions facing the system architect. It is helpful to take into account how the dependencies evolved during the course of the development. This can answer questions like "Which issue caused this dependency cycle to get added to the system?" allowing architects to identify and remedy situations that cause unwanted coupling to occur.

SUMMARY

One embodiment provides a method for engineering software architectures with its various software artifacts of complex cyber-physical systems of different technical domains including the steps of: (a) diagnosing and categorizing dependencies of the software artifacts triggered by revisions or commits, in particular with respect to at least one of a huge amount of software artifacts dependencies in the software architectures of the complex cyber-physical systems, addressing information overload due to automated extraction of the dependencies and lacking information about the relation with evolution information of the complex cyber-physical system; (b) relating changes in the diagnosed and categorized dependencies with change events on the software artifacts, such as those in particular caused by at least one of enhancing the complex cyber-physical system with new features as required by market demands and fixing defects found in operation or raised during maintenance of the complex cyber-physical system, and (c) representing the diagnosed and categorized dependencies and the related changes in the diagnosed and categorized dependencies.

In one embodiment, according to a dependency diagnosis process, diagnosing for a single revision or commit the software artifacts dependencies, the software artifacts being considered as nodes and at least three node groups provided as per different diagnostic criteria, (i) a graph $G=<N,E>$, where N is a set of nodes and E is a set of tuples (a,b) representing a dependency from a to b, when $a,b \in N$, is inputted and (ii) at least three node sets, a layered node set with layered nodes grouped by levels, a tangled node set with tangled nodes grouped due to "Strongly Connected Components", whereby the group encompasses all nodes participating in the tangled node set and a context node set with context nodes grouped for reducing clutter and which do not require detailed dependency information to be represented, are outputted.

In one embodiment, according to a dependency diagnosis process, diagnosing for a single revision or commit the software artifacts dependencies, the software artifacts being considered as nodes and at least three node groups provided as per different diagnostic criteria, (i) a graph $H=<N,E>$, where N is a set of nodes and E is a set of tuples (a,b) representing a dependency from a to b, when $a,b \in N$, is inputted and (ii) at least four node sets, a layered node set with layered nodes grouped by levels, a tangled node set with tangled nodes grouped due to "Strongly Connected Components", whereby the group encompasses all nodes participating in the tangled node set, an independent node set with independent nodes not having an inherent ordering via dependency relations and a context node set with context nodes grouped regarding a Lower Context, holding context nodes with only incoming dependencies and an Upper Context, having context nodes with only outgoing dependencies, for reducing clutter and which do not require detailed dependency information to be represented, are outputted.

In one embodiment, the nodes, the nodes groups, the node sets are represented by a graphical representation representing in a single graph for each revision or commit on a user scrollable display the nodes as geometric figures, in particular cycles, the nodes groups respectively the node sets as subareas, in particular rectangular areas, and the dependencies between the nodes as arrows.

In one embodiment, at a variation in time of the dependencies over courses of evolution of the software architectures this variation associated with corresponding evolution information based on the revisions or commits is represented by a time bar representation.

In one embodiment, the time bar representation includes representation control elements for indicating or marking playback control, revision information, progress of the evolution information being transitioned through and diagnostic events.

In one embodiment, the nodes are colored based on the number of dependencies each node has.

In one embodiment, instead of animating the related changes in the diagnosed and categorized dependencies, each related change in the diagnosed and categorized dependencies is kept as a separate diagram on the user scrollable display, whereby the related changes from the previous diagram are highlighted in different colors.

Another embodiment provides a tool for engineering software architectures with its various software artifacts of complex cyber-physical systems of different technical domains including: (a) Source Repository Analysis Means for (a1) diagnosing and categorizing dependencies of the software artifacts triggered by revisions or commits, in particular with respect to at least one of a huge amount of software artifacts dependencies in the software architectures of the complex cyber-physical systems, addressing information overload due to automated extraction of the dependencies and lacking information about the relation with evolution information of the complex cyber-physical system, and (a2) relating changes in the diagnosed and categorized dependencies with change events on the software artifacts, such as those in particular caused by at least one of enhancing the complex cyber-physical system with new features as required by market demands and fixing defects found in operation or raised during maintenance of the complex cyber-physical system, and (b)

Representation Means for representing the diagnosed and categorized dependencies and the related changes in the diagnosed and categorized dependencies, which are connected with the Source Repository Analysis Means.

In one embodiment, the Source Repository Analysis Means are connected to a Version Control System for the triggering purposes by the revisions or commits and to an Issue/Change Event Management System for the purposes of relating the changes in the diagnosed and categorized dependencies with the change events on the software artifacts.

In one embodiment, the Source Repository Analysis Means include Representational Support Means transforming data processed in the Source Repository Analysis Means in a form usable by the Representation Means designed as a workspace and interface for a user.

In one embodiment, the Source Repository Analysis Means are designed such, in particular they include an Artifact Analyzer and an Analysis Engine forming a first common Functional Unit, that according to a dependency diagnosis process, diagnosing for a single revision or commit the software artifacts dependencies, the software artifacts being considered as nodes and at least three node groups provided as per different diagnostic criteria, (i) a graph G=<N,E>, where N is a set of nodes and E is a set of tuples (a,b) representing a dependency from a to b, when a,b ∈ N, is inputted and (ii) at least three node sets, a layered node set with layered nodes grouped by levels, a tangled node set with tangled nodes grouped due to "Strongly Connected Components", whereby the group encompasses all nodes participating in the tangled node set and a context node set with context nodes grouped for reducing clutter and which do not require detailed dependency information to be represented, are transferred for outputting purposes to the Representation Means.

In one embodiment, the Source Repository Analysis Means are designed such, in particular they include an Artifact Analyzer and an Analysis Engine forming a first common Functional Unit, that according to a dependency diagnosis process, diagnosing for a single revision or commit the software artifacts dependencies, the software artifacts being considered as nodes and at least three node groups provided as per different diagnostic criteria, (i) a graph H=<N,E>, where N is a set of nodes and E is a set of tuples (a,b) representing a dependency from a to b, when a,b ∈ N, is inputted and (ii) at least four node sets, a layered node set with layered nodes grouped by levels, a tangled node set with tangled nodes grouped due to "Strongly Connected Components", whereby the group encompasses all nodes participating in the tangled node set, an independent node set with independent nodes not having an inherent ordering via dependency relations and a context node set with context nodes grouped regarding a Lower Context, holding context nodes with only incoming dependencies and an Upper Context, having context nodes with only outgoing dependencies, for reducing clutter and which do not require detailed dependency information to be represented, are transferred for outputting purposes to the Representation Means.

In one embodiment, the Representation Means are designed such, in particular they include a Graphical Representation Generator and a Unit Supporting Representations forming a second common Functional Unit, that the nodes, the nodes groups, the node sets are represented by a graphical representation representing in a single graph for each revision or commit on a user scrollable display the nodes as geometric figures, in particular cycles, the nodes groups respectively the node sets as subareas, in particular rectangular areas, and the dependencies between the nodes as arrows.

In one embodiment, either the Representation Means or the Source Repository Analysis Means, in particular the Representational Support Means, and the Representation Means are designed such that at a variation in time of the dependencies over courses of evolution of the software systems this variation associated with corresponding evolution information based on the revisions or commits is represented by a time bar representation.

In one embodiment, the Representation Means are designed such that the time bar representation includes representation control elements for indicating or marking playback control, revision information, progress of the evolution information being transitioned through and diagnostic events.

In one embodiment, the Representation Means are designed such that the nodes are colored based on the number of dependencies each node has.

In one embodiment, the Representation Means are designed such that instead of animating the related changes in the diagnosed and categorized dependencies, each related change in the diagnosed and categorized dependencies is kept as a separate diagram on the user-scrollable display, whereby the related changes from the previous diagram are highlighted in different colors.

In one embodiment, the tool includes at least one program module encompassing the means and running on a computer such that a computer readable storage media embodying the at least one program module is executed.

In one embodiment, the at least one program module is stored on a storage media being insertable into the computer with the user-scrollable display or being part of the computer with the user-scrollable display.

BRIEF DESCRIPTION OF THE DRAWINGS

Example aspects and embodiments of the invention are explained in detail below with reference to the figures, in which.

DETAILED DESCRIPTION

Figure 1:
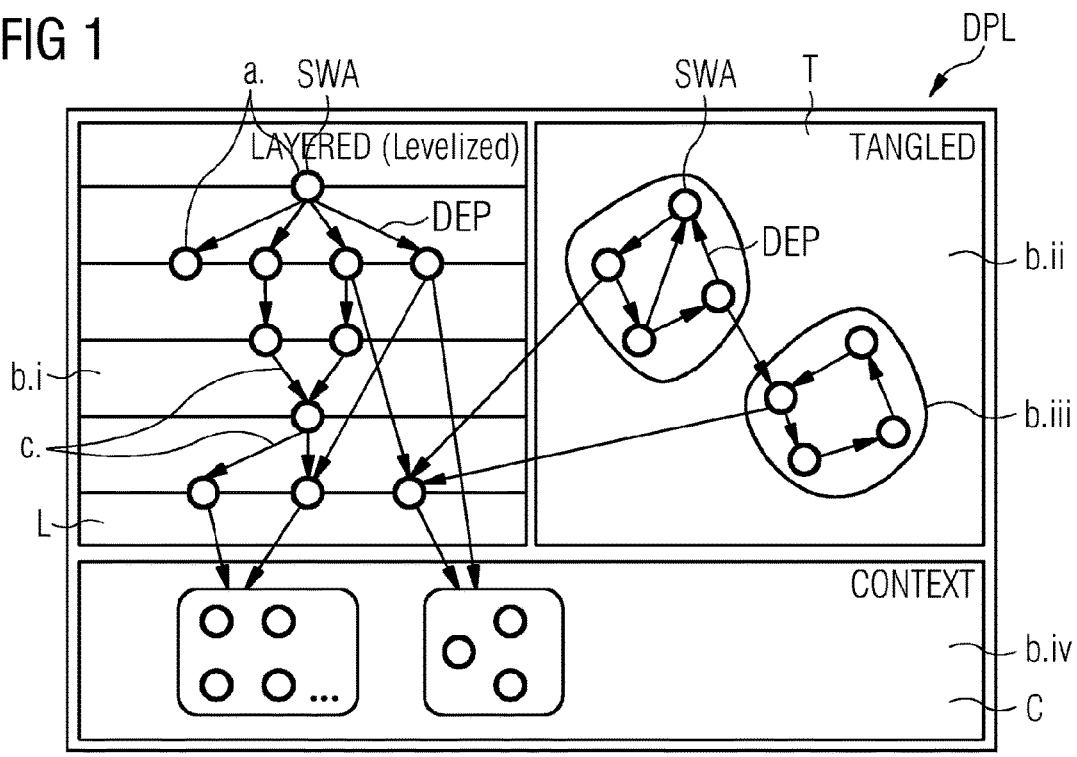
FIG. 1 shows a graphical representation of diagnosed and categorized software artifacts dependencies and related changes in the diagnosed and categorized dependencies with change events on the software artifacts according to one embodiment of the invention.

Embodiments of the invention provide a method and a tool for engineering software architectures with its various software artifacts of complex cyber-physical systems of different technical domains which gives architects engineering the software of such software architectures with its various software artifacts of complex cyber-physical systems a powerful way to identify and control architecture erosion in codebases of the complex cyber-physical systems.

Some embodiments provide a method or tool that may (i) diagnose and categorize software artifacts dependencies in software architectures of complex cyber-physical systems of different technical domains triggered by revisions or commits, (ii) relate changes in the diagnosed and categorized dependencies with change events on the software artifacts, such as those in particular caused by at least one of enhancing the complex cyber-physical system with new features as required by market demands and fixing defects found in operation and/or raised during maintenance of the complex cyber-physical system, and (iii) represent the diagnosed and categorized dependencies and the related changes in the diagnosed and categorized dependencies.

In summary, some embodiments of the invention may efficiently diagnose the quality of software artifact dependencies, while considering the relevant engineering change events in time.

Thereby the following definitions of terms are used or needed with respect to the invention:

Software Artifact: An entity physically managed as part of a software system, e.g. a complex cyber-physical system of different technical domains. Artifacts typically include source files, directories, configuration files and deployable components. There are also logical entities (typically related to programming languages) like classes, functions, modules that the physical artifacts describe. However, for the purpose of the present invention, they are treated uniformly.

Version Control: A software artifact undergoes changes as part of the engineering process. A version control system keeps track of what changes were made in the collection of artifacts as part of a system, e.g. a complex cyber-physical system of different technical domains.

Issue/Change Event: Also referred to as a feature/requirements, defect, change request. These are items that are recorded as part of the engineering process, that motivate a change to one or more software artifacts in the system. They are usually managed in a dedicated issue management system, with unique identifiers so that they can be referenced in other parts of the software engineering process.

Revision/Commit: A revision or commit is one unit of change as considered by a version control system. A commit can be associated with an issue, and this fact can be recorded in a field provided by the version control system.

Dependency: Software artifacts often cannot accomplish their responsibilities alone and hence collaborate with other artifacts. If artifact A uses logical entities provided by artifact B, we can say that A depends on B. The dependencies can be actually manifested via function calls, namespace imports, class instantiation and so on. Another aspect is that the dependencies have to be dealt with at compile-time, link-time or run-time. However, all these cases are treated uniformly.

Some embodiments provide a tool that includes at least one program module running on a computer or in addition is stored on a storage media being insertable into the computer with a user-scrollable display or being part of the computer with a user-scrollable display. Regarding both options (alternatives) the tool is preferably an "App" (Application Software) running on a computer, which could be a desktop PC or an "All-In-One" PC, a smartphone, a notebook, a tablet etc. In other words it is as a digital tool preferably a purpose-designed computer program product. The tool can be sold or distributed separately or in common with the complex cyber-physical system of different technical domains engineered, developed and/or used for technical capital and/or producer goods. Such a good could be for example a telecommunication appliance, a domestic appliance, a medical appliance, an industrial automation system, an energy supply system, a medical supply system etc.

In some embodiments, a dependency diagnosis process, diagnosing for a single revision or commit the software artifacts dependencies, the software artifacts being considered as nodes and at least three node groups provided as per different diagnostic criteria, (i) a graph G=<N,E>, where N is a set of nodes and E is a set of tuples (a,b) representing a dependency from a to b, when a,b ∈ N, is inputted and (ii) at least three node sets,—a layered node set with layered nodes grouped by levels, a tangled node set with tangled nodes grouped due to "Strongly Connected Components (SCC)", whereby the group encompasses all nodes participating in the tangled node set and a context node set with context nodes grouped for reducing clutter and which do not require detailed dependency information to be represented —, are outputted.

In some embodiments, a dependency diagnosis process, diagnosing for a single revision or commit the software artifacts dependencies, the software artifacts being considered as nodes and at least three node groups provided as per different diagnostic criteria, (i) a graph H=<N,E>, where N is a set of nodes and E is a set of tuples (a,b) representing a dependency from a to b, when a,b ∈ N, is inputted and (ii) at least four node sets,—a layered node set with layered nodes grouped by levels, a tangled node set with tangled nodes grouped due to "Strongly Connected Components (SCC)", whereby the group encompasses all nodes participating in the tangled node set (T), an independent node set with independent nodes not having an inherent ordering via dependency relations and hence rendering to use a typical force layout within the bounds provided, and a context node set with context nodes grouped regarding a Lower Context, holding context nodes with only incoming dependencies and an Upper Context, having context nodes with only outgoing dependencies, for reducing clutter and which do not require detailed dependency information to be represented —, are outputted.

In some embodiments, the nodes, the nodes groups, the node sets are represented by a graphical representation representing in a single graph for each revision or commit on a user scrollable display the nodes as geometric figures, in particular cycles, the nodes groups respectively the node sets as subareas, in particular rectangular areas, and the dependencies between the nodes as arrows.

In some embodiments, at a variation in time of the dependencies over courses of evolution of the software systems this variation associated with corresponding evolution information based on the revisions or commits is represented by a time bar representation.

Against the background of the aforementioned statements the invention provides an advanced architecture diagnostics by relating engineering or maintenance information with changes in dependency information of software artifacts. Thus it allows the architect of a software system to detect changes in dependencies as the software gets revised. For each change detected, (as shown by a marker on a time bar), the method or tool allows one to get related information on why the change has been introduced as explained via the related engineering or maintenance information (e.g. commit message, issue description and issue priority).

This increases the understanding of the change, and it can signal to the architect of the software system that the feature (addressed by the issue/change event) and its implementation largely contradicts the overall software architecture dependency structure. The feature might not fit and may not have been anticipated at all when initially architecting the software system.

The advantages are better information for reengineering planning and improving architecture quality.

Moreover with regard to immediate representation of architecture quality and due to the diagnostic categorization and systematic presentation of nodes, the method and tool is able to give a quickly understood picture of the architecture quality. If the software system does not have a tangled section, it means that the dependencies have been managed well. If there is a tangled section, they can be isolated quickly for further study.

Thus it has the advantage that the architecture quality can be automatically monitored.

Furthermore regarding the aspect of scalability to large codebases the diagnostic process explicitly partitions the nodes of the software system. It further provides sub-grouping mechanisms, like the CTX_PART_FUNC( ), and the Connected Groups features so that the method and the tool can automatically elide information based on what groups the nodes belong to. For example, one can collapse all third-party dependencies to their respective groups so that such less important information does not distract the overall diagnostic picture.

Moreover, the supporting views allow the user to filter the input set of nodes according the architectural level currently under observation (e.g. restrict to directory level, or package level or class level).

Thus the advantage is that the architecture analysis of large software systems is handled efficiently without overwhelming the user.

Finally with respect to a "step-by-step software system comprehension" the invention allows an intuitive understanding of the top and bottom levels of the architecture. This allows the architect to spot nodes that can be easily replaced because not many nodes depend on them. The representation also allows understand the cascading effects caused when modifying heavily-used parts of the software system.

The advantages are that the user is allowed to control the flow of information, by first getting an overview, and then drilling down to details and that understanding the third-party dependencies can reveal how dependent the architecture is on partners, and the strategic impact on the software system due to vendor change, lack of third-party maintenance and so on.

Moreover advantageous further developments of the invention arise out of the following description of example embodiments of the invention according to the FIGS. 1 to 8, discussed below.

A. With regard to one embodiment of the invention the technical means and features are described to express the diagnostic categorization of dependencies DEP of software artifacts SWA in software architectures of the complex cyber-physical systems of different technical domains (in the following labeled also abridged as "software systems") and the representing of the diagnosed and categorized software artifacts dependencies SWA, DEP on a user-scrollable display DPL according to FIG. 1 as well as evolution information of the complex cyber-physical system according to FIG. 2 thereby using the following diagnostic categorizations:

1. Some of the dependencies are layered (levelized).
2. Some of the dependencies are in cycles.
3. Some dependencies are out-of-scope or on third-party (with respect to the system under examination), the exact details of which are less important.
4. At a first glance, it is important to get just an overview and diagnostic categorizations of dependencies. The user can then interact with the diagram to get more details.
5. The dependencies vary in time over the course of the evolution of the complex cyber-physical system, but some important patterns need to be highlighted like introduction of cycles, new third-party dependencies In order to address the points "1. . . . 4." FIG. 1 shows a graphical representation of a categorization, in particular representing information in a single graph for each revision or commit on the user-scrollable display DPL. It assumes that a set of software artifacts and their dependencies are prepared as input. In FIG. 1 there are shown:

a. Nodes: The software artifacts are SWA rendered as simple geometric figures (like circles as shown in this example). A text label can be associated with a node. The position of the node is determined by what group of nodes it belongs to.

b. Node groups: The principal advantage of this representation is that the nodes are grouped as per different diagnostic criteria. This allows an immediate evaluation of the overall dependency relation.

i. Layered (Levelized): The nodes that are not involved in any cyclic dependencies are grouped as layered nodes. The nodes with no outgoing dependencies are placed at the bottom—at level 1. The direct dependents of the bottom layer are placed on level 2, and the subsequent dependents are placed on successively higher levels. Nodes with no incoming dependencies DEP are placed at the top most level.

ii. Tangled: Nodes that participate in dependency cycles are placed in another group called the tangled nodes. There can be more than one cycles present in a dependency graph, and hence they are presented as a connected group of nodes, so that the user can easily determine the number of cycles.

iii. Connected Groups: All nodes participating in one cycle in the tangled section. A connected group is an indication that the member nodes probably require restructuring. For example, either all composing software artifacts SWA of a connected group are combined into a compound one (e.g. an own directory) or its software artifacts SWA are split into several groups.

iv. Context: Software artifacts SWA external to the system are often of less interest, and do not require detailed dependency information to be represented. Hence, it is first to separate such nodes into a context group, and then further group them by criteria like a common namespace or common library module. If there are a large number of nodes in a sub-group, an ellipsis symbol is used to indicate that there are more. This should be enough at this place, because it is not intended to overwhelm the user (reader) with non-critical information.

c. Dependencies: The dependencies DEP between the nodes are represented as arrows, with the arrow head being at the target of the dependency. It is required that the edges must have less contrast than the nodes so that the position of the nodes are clearer. Since the position of the nodes gives more vital information, the edges are details that can be de-emphasized. Similarly, the dependencies DEP to individual context nodes are not shown initially. Furthermore, dependency targets terminate at the connected-group of nodes, again eliding non-critical information so that the user is not distracted by them.

Figure 2:
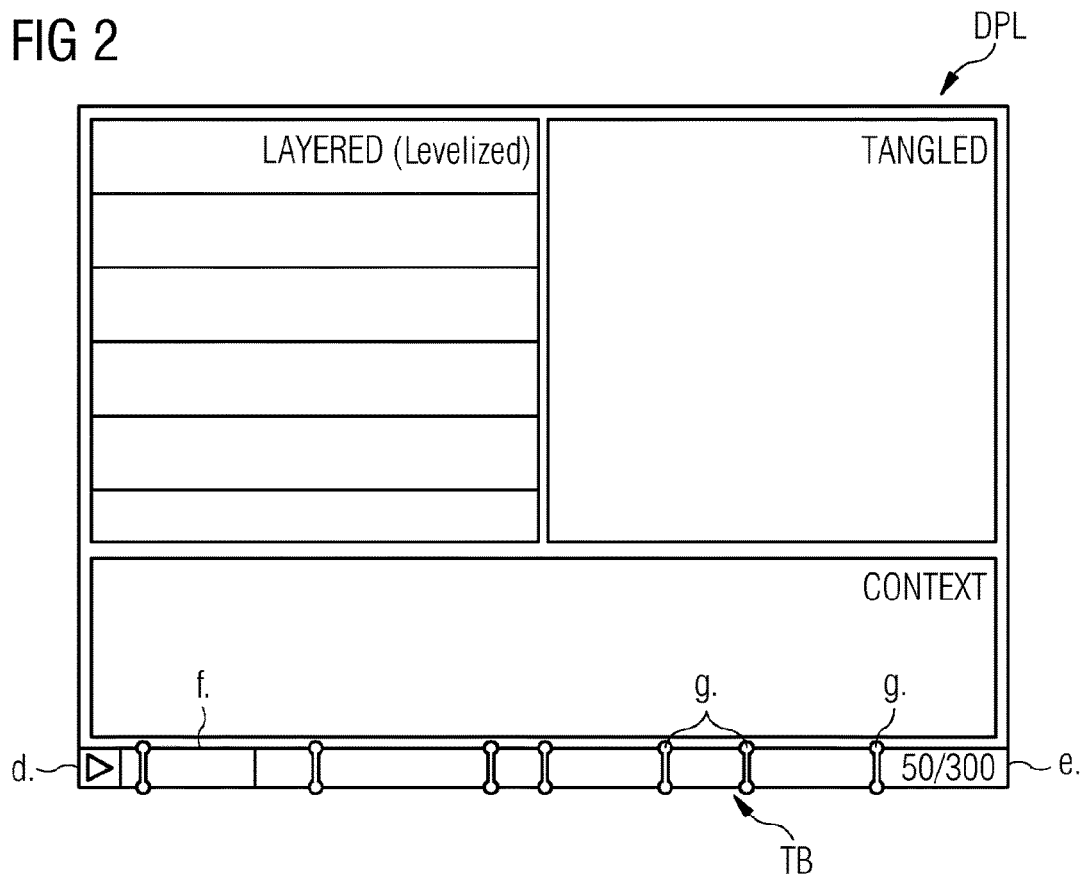
FIG. 2 is based on the representation shown in FIG. 1 and shows an additional time bar representation representing at a variation in time of dependencies over courses of evolution of software systems this variation associated with corresponding evolution information based on revisions or commits.

To address point "5.", FIG. 2 shows based on the representation shown in FIG. 1 an additional representation by a time bar TB representing at a variation in time of dependencies over courses of evolution of software systems this variation associated with corresponding evolution information based on revisions or commits, in particular representing the information again in a single graph for each revision or commit on the user scrollable display DPL.

The aim of the time bar TB is to convey to the user the presence of evolution information. The evolution information is available as a range of revisions obtained from a version control system (cf. FIG. 3). Each revision has a particular configuration of software dependencies. Moving from one revision to the other can result in nodes being added, dependencies getting updated. The level graph reflects such changes via animations. Hence, the user is able to view the changes in dependency as if like a video.

The time bar TB comprises of the following sub-components:

d. Playback control: For the user to control the transition of information.

e. Revision information: E.g. in the format of X/Y, where Y is the total number revisions present in the range under consideration, and X is the number of revisions that have already been transitioned through.

f. Progress bar: To intuitively indicate the percentage of evolution information transitioned through.

g. Diagnostic events: These are markers placed over the time bar to indicate that an event of interest has happened. Important events include:
    Addition/Removal of a cycle
    Addition/Removal of context nodes
    Evolution points of tightly coupled nodes
    User-configurable conditions.

Figure 3:
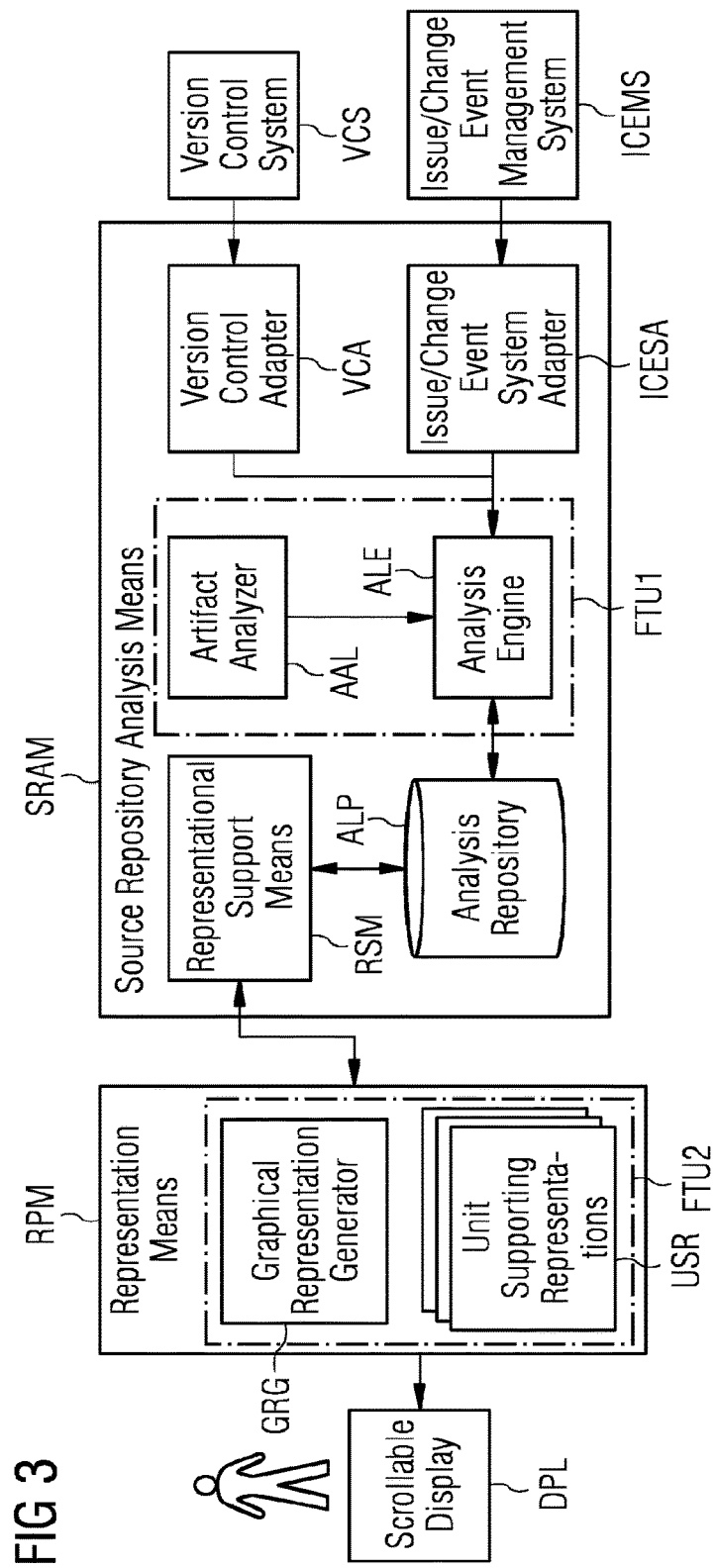
FIG. 3 shows a functional block diagram of a basic architecture of a tool according to example embodiments of the invention.

FIG. 3 shows based on a functional block diagram a schematic realization of a tool according to an example embodiment of the invention.

The two main sub-systems of the tool are:

I. Source Repository Analysis SRAM: This sub-system interfaces via adapters with external sources of data, a Version Control System VCS and an Issue/Change Event Management System ICEMS. The Source Repository Analysis SRAM utilizes the following components to extract and prepare the data for presentation. It includes:

A Version Control Adapter VCA: This component is used, in particular necessary, for customizing the data import process for a specific Version Control System VCS. It interfaces the Source Repository Analysis SRAM with the Version Control System VCS. In other words: The Source Repository Analysis SRAM is connected with the Version Control System VCS. By using the term "connected" it is not meant merely a physical connection, but rather a connection in the sense of a software-related assignment for data transfer, because FIG. 3 depicts a functional block diagram of the (digital) tool realized essentially and preferably by program modules. Moreover there can be multiple of such adapters.

An Issue/Change Event System Adapter ICESA: Similarly, the Issue Change Event Management Systems ICEMS have specific interfaces for external parties to extract data, and hence this component can be used to interface the Source Repository Analysis SRAM with the Issue Change Event Management Systems ICEMS respectively with them.

In other words again: The Source Repository Analysis SRAM is connected with the Issue Change Event Management System ICEMS. By using the term "connected" it is not meant merely a physical connection, but rather a connection in the sense of a software-related assignment for data transfer, because FIG. 3 depicts a functional block diagram of the (digital) tool realized essentially and preferably by program modules.

An Artifact Analyzer AAL: This is the component that actually extracts dependency information from a software artefact SWA. Depending on the programming language, specific analyzers have to be used.

An Analysis Engine ALE: It forms a first common Functional Unit FTU1 with the Artifact Analyzer AAL. The Analysis Engine ALE is the component that coordinates the data flow between the previous components, and ensures that interlinked and consistent data is recorded to an Analysis Repository (cf. subsequent bullet point). It tracks changes between various versions of an artifact and records the modifications to software dependencies. It also creates a mapping between the issues/change event and the revision or commit that caused the change.

An Analysis Repository ALP: This is a persistent store that is needed to avoid re-importing the entire range of versions, and supports incremental updates.

Representational Support Means RSM: This component being linked to the Analysis Repository ALP transforms the data in a form usable by Representation Means designed as a workspace and interface for a user (cf. subsequent bullet point).

II. Representation Means RPM: This sub-system, which is interfaced with the Source Repository Analysis SRAM via the Representational Support Means RSM included therein, prepares as mentioned above a workspace for the user to examine the complex cyber-physical system. In other words: The Source Repository Analysis SRAM is connected via the Representational Support Means RSM with the Representation Means RPM. By using the term "connected" it is not meant merely a physical connection, but rather a connection in the sense of a software-related assignment for data transfer, because FIG. 3 depicts a functional block diagram of the (digital) tool realized essentially and preferably by program modules. Moreover the Representation Means RPM allow the user to specify and load the relevant revisions. The workspace comprises the following components, which form a second common Functional Unit FTU2:

- A Graphical Representation Generator GRG: This component uses the representation described above to present the information extracted by the Source Repository Analysis. The generation algorithm is described in the next section.
- An Unit Supporting Representations USR: In addition to the graphical view, the tool provided additional views like tree views to aid the user in drilling down multiple levels of artifacts. This allows the user to explore as per the information need, and not get exposed to all the information at once. Examples of supporting information are:
    1. Revision/Commit message,
    2. Issue/Change Event description of the issue id specified with the commit.

The graphical presentation can be done with any selection of software artifacts spread over the hierarchical structure of the software system. The user is able to start with a presentation of the highest level of the software structure to get a high-level overview. For example, the represented nodes reflect the highest-layer software directories (as software artifacts) of the software directory structure. All software artifacts (like further subdirectories and their files) below such a high-layer directory and their dependencies are aggregated and represented by this high-layer software directory artifact.

By identifying tightly coupled software directory artifacts of the layered section or connected groups of the tangled section an engineer or software architect can drill down into the substructure of subdirectories and files of a respective software artifact directory on the uppermost hierarchy layer of directories. This process can be repeated several times down to the lowest-layer software directory/file artifacts of the overall software structure.

Figure 4:
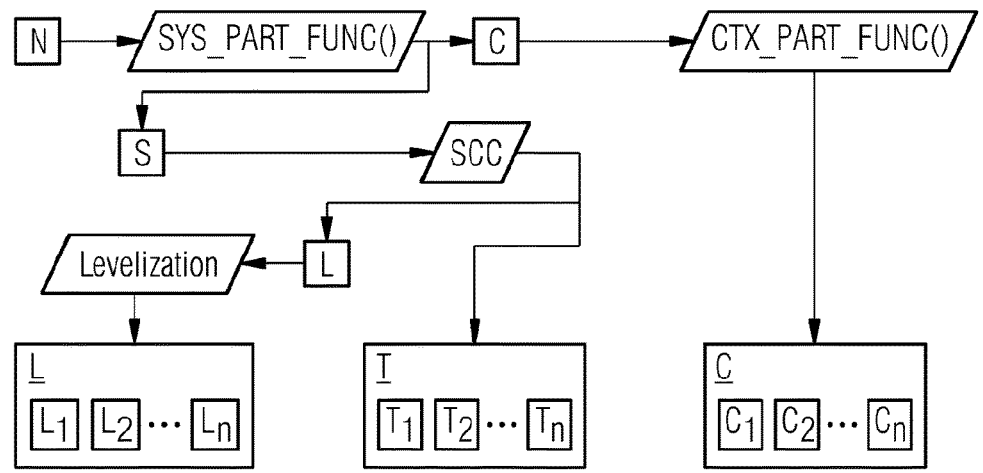
FIG. 4 shows a basic course of a dependency diagnosis process according to the example embodiment shown in FIG. 1, FIG. 5 a graphical representation of diagnosed and categorized software artifacts dependencies and related changes in the diagnosed and categorized dependencies with change events on the software artifacts according to an example embodiment of the invention.

FIG. 4 shows the basic course of a dependency diagnosis process for a single revision/commit according to an example embodiment of the invention. The process is divided/separated into:

Input: A graph G=<N,E>, where N is a set of nodes and E is a set of tuples (a,b) representing a dependency from a to b, when a,b ∈ N. Each revision or commit is represented by one of such graph.

Processing:

Partition N into two sets system S and context C, according to SYS_PART_FUNC( ) which is a user-defined partition function. A default function that looks for pre-defined node attributes can be provided for convenience. At the end of this step, third-party software artifacts would be in set C, and the system being diagnosed is in set S.

Find the "Strongly Connected Components (SCC)" in S, such that for the tangled set T the sets {T1, T2 ... Tn} are created, where each Ti is a connected component.

Create a set L=S−(T1 U T2 ... U Tn), representing the layered nodes.

For set L,

Perform the levelization algorithm, and attach to each node the respective level number.

Group the nodes according to levels, resulting in sets {L1, L2 ... Ln}

For context set C, partition the nodes according to CTX_PART_FUNC( ) which is a user-defined partition function for grouping third-party dependencies. A default function that looks for typical third-party package naming conventions can be provided for convenience. The partition function produces sets {C1, C2 ... Cn}.

For each set Ci

Add Ci as a node in N

Add an edge (a, Ci) in E if there is (a,x) in E such that x ∈ C. This allows the rendering of target edges to the group node instead of the individual third party dependency.

Output:

The sets

L: The set of layered nodes grouped by levels

T: The set of tangled nodes grouped by "Strongly Connected Components (SCC)"

C: The set of context nodes grouped as needed to reduce clutter

The diagnostics over the evolution data (Evolution analysis) can be done as follows:

Input:

R: The set of revisions over which the dependency diagnostic is to be carried out, ordered by a sort criterion, e.g. the date of the commit.

Diff Analyses: A set of analyses that run on the differences between dependencies. An analysis takes the difference as input and returns a revision marker and description denoting that the difference is significant, and is worthy of examination.

Process:

For each revision $r_j$ in R, perform the dependency diagnostics as described in section (d.), giving the result DepDiag($r_j$)=<$L_j$, $T_j$, $C_j$>

For each result tuple except the last one, calculate the difference $\text{Diff}_j$=DepDiag($r_{j-1}$)—DepDiag($r_j$)

Pass each difference $\text{Diff}_j$ to the set of diff analyses given as input. Collect any markers returned and associate them with revision $r_j$.

Output:

An annotated set of revisions containing markers that can now be displayed by the time bar in the level-graph representation.

B. With regard to another embodiment of the invention the technical means and features are described to express the diagnostic categorization of the dependencies DEP of the software artifacts SWA in the software architectures of the complex cyber-physical systems of different technical domains (in the following labeled also abridged as "software systems") and the representing of the diagnosed and categorized software artifacts dependencies SWA, DEP on the user-scrollable display DPL according to FIG. 5.

Dependency analysis is one of the key techniques used for evaluating the architectures of existing software systems. Node-link diagrams are often used to visualize the results of the extraction of dependency information. However, they often overwhelm the user with too much information and insufficient organization.

Thus it is designed a structured dependency representation that (i) allows users to orient themselves efficiently with an unfamiliar codebase, (ii) make some qualitative observations about the dependency structure.

Viewpoints are used in architecture descriptions to structure the information according to a specific set of concerns. It is defined a viewpoint-oriented approach to developing visualizations, using a novel viewpoint being defined and called the "Classified Dependencies Viewpoint (CDV)". Given a hierarchical information space, CDV represents the dependencies at each node of the hierarchy. CDV categorizes child nodes of a specified node into levelized, tangled, independent and context nodes, making it easy for the user to get quick impressions of the dependency structure. Starting from the root level, the user can then decide to explore nodes of interest going, e.g. from directories to files, to design software artifacts SWA like classes and functions.

In the following it is demonstrated the feasibility of the approach in a prototype by applying it to a real-world code-base and discuss the issues that can serve as a guide for practitioners looking to implement such an approach.

Viewpoints as defined in [13] are used to view the architectural information via a lens of a specific set of concerns. This allows the various stakeholders of a project to view information only pertinent to their areas of responsibility while not being overwhelmed with the large amounts of data typically contained in an architectural description.

It is going to believe that viewpoints allow visualization designers to tackle the scale and complexity issues that are faced by typical software visualization methods. To this end, it is designed a lightweight process that can be used to develop custom visualizations, and will demonstrate how such an approach can result in novel approaches to oft-studied visualizations like dependency graphs.

B.1. Explanation of the Viewpoint-Oriented Approach (Process)
1. Viewpoint Definition
   a. Define Viewpoint concerns and tasks that a visual representation of the viewpoint can help with
   b. Determine the visual encodings and interactions to be supported in aid of the tasks
   c. Determine a viewpoint model detailing the entities, relations and constraints involved
   d. Develop any required algorithms needed to help in instantiating the model
2. Viewpoint Instantiation
   a. Decide on the specific configuration of the viewpoint to be used for the task at hand
   b. Find sources in the software artifacts for the entities and relations drawn up
   c. Prepare the viewpoint input data doing any filtering or de-duplication steps
   d. Instantiate the viewpoint along with any supporting infrastructure needed
3. Revisit the steps in order as informed by the results B.2. Classified Dependencies Viewpoint (CDV) According to this Process A typical use case when confronted with new codebases is to understand the various parts of the system. It is also necessary to get "oriented", i.e., understand what are the top-level or bottom-level parts. At the same time, it would be likely to have a step by step approach to assimilate this information, starting from an overview and then interactively exploring interesting areas. Thus it is decided to develop a new viewpoint called the Classified Dependencies Viewpoint (CDV) helping in these and similar system tasks.

TABLE 1 summarizes the viewpoint information as required by [13]. As per the first step in the process, it is added a Tasks section to indicate the kind of scenarios that a visualization of this viewpoint would help in.

TABLE 1

"CDV SUMMARY"

| Viewpoint Name | Classified Dependencies Viewpoint (CDV) |
|---|---|
| Viewpoint Overview | The goal of CDV is to provide the user a qualitative overview of the dependency structure |
| Stakeholders Concerns | System Architects, Developers, Maintainers Given a hierarchical information space, show the qualified dependencies between the children of one node. Distinguish third-party/context as well as independent nodes. Detect strongly connected components or tangled nodes. Determine a levelization of nodes for which such an operation is possible |
| Model Kinds | Binary Relations and Property Graphs |
| Tasks | Get an overview of dependency relations at each level Find top-level and bottom-level nodes Examine cycles in tangled nodes. Show dependency details for focused node (e.g highlight incoming and outgoing dependencies). Filter out nodes or whole categories of nodes "Drill down" and navigate the hierarchy Change the underlying relation used to generate the view |

The CDV operates on a hierarchical information space, i.e., there is a containment relation between entities in a tree-like fashion starting from a root node. Following the typical structure of trees some nodes are leaf nodes (contain no other nodes), while others are composite nodes (containing child nodes).

Examples of hierarchies in terms of software artifacts are directory≻ file≻ class≻ method   or   dll≻ component≻ class≻ method ("≻" is explained in a later section, but for now can be read as "can Contain") . The specific hierarchy chosen is determined by the artifacts to be examined, the semantics of the programming environment and what information can be reliably extracted from the artifacts themselves.

Hierarchies can be gradually explored starting from the root level, allowing the user to be gradually be exposed to the details of the dependencies between artifacts. Given a composite node, it could be chosen to examine the dependency information of only the set of child nodes, or sibling set. An additional set of nodes that are involved in dependencies with these child nodes are added to be examined. These nodes form the dependency context and reveal to the user the "surroundings" of the sibling set.

B.2.1. Description of How the Nodes in the Sibling Set Can be Classified:
  Independent nodes: Within the sibling set, it is thought of some nodes that are independent, i.e., they do not share any dependencies within the sibling set. They might have dependencies with context nodes, however.
  Tangled nodes: Some nodes may be involved in strongly connected components when observed in terms of a dependency graph. Such dependencies may be allowed in certain scenarios, however, it is important to alert the user to the existence of such patterns.
  Levelizable nodes: If the independent and tangled nodes are removed from the sibling set, the remaining nodes are amenable for the levelization algorithm [3] to be performed. The result of the algorithm is that each node in the levelizable set is assigned a level. Nodes with no outgoing dependencies are at level 0, nodes at higher levels get assigned level n+1, where n is the highest level outgoing dependency. This ensures that there will be a clear demarcation between the top-level nodes and the bottom-level nodes, while allowing the user to observe how the rest of the mid-level nodes are organized.

B.2.2. Visual Encoding

Having decided on the concerns and tasks of the viewpoint a suitable visual representation for the various kinds of nodes specified is determined. When representing data visually, the position channel has the most impact in comprehension tasks [14]. Hence, according to FIG. 5 clearly demarcated areas for the kinds of nodes, namely Levelized L, Tangled T, Independent I and Context C are used. In particular, there are two areas used for Context C:

(i) Lower Context $C_{LO}$, holding context nodes with only incoming dependencies DEP and (ii) Upper Context $C_{UP}$, having context nodes with only outgoing dependencies DEP.

This kind of visual partitioning allows the user to get a quick picture of the kinds of dependencies DEP at the selected composite node.

Figure 5:
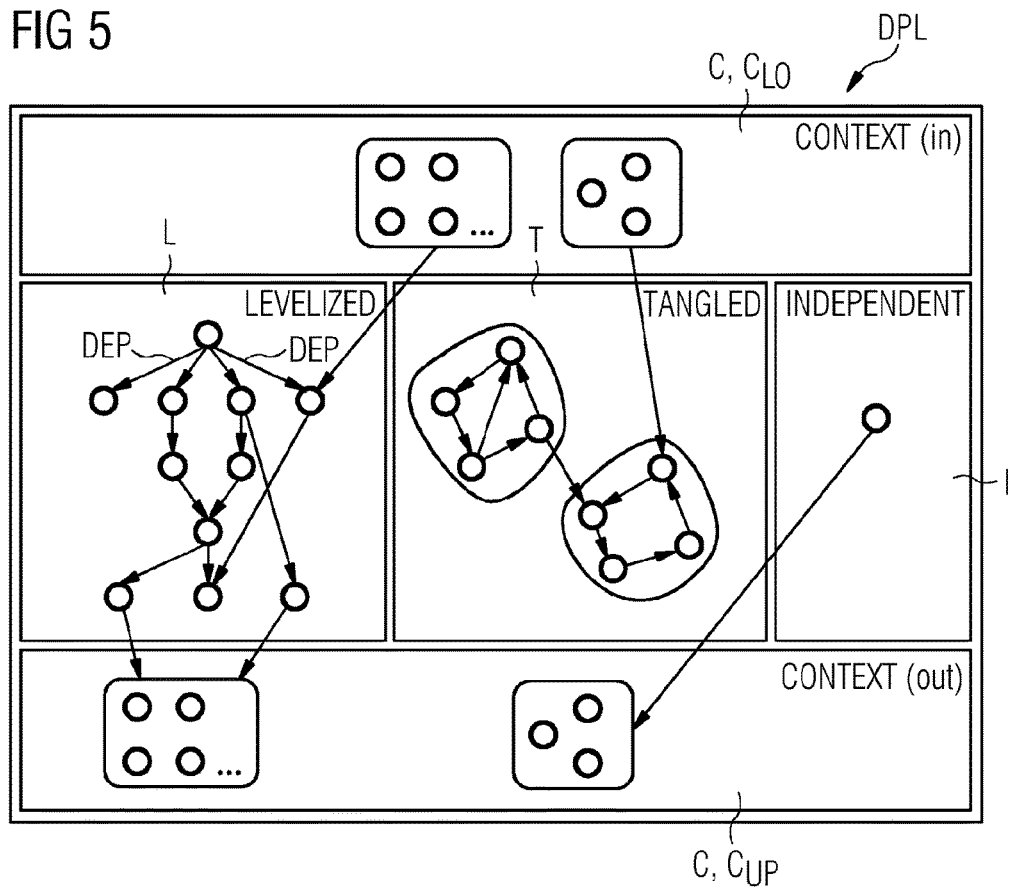
Figure 6:
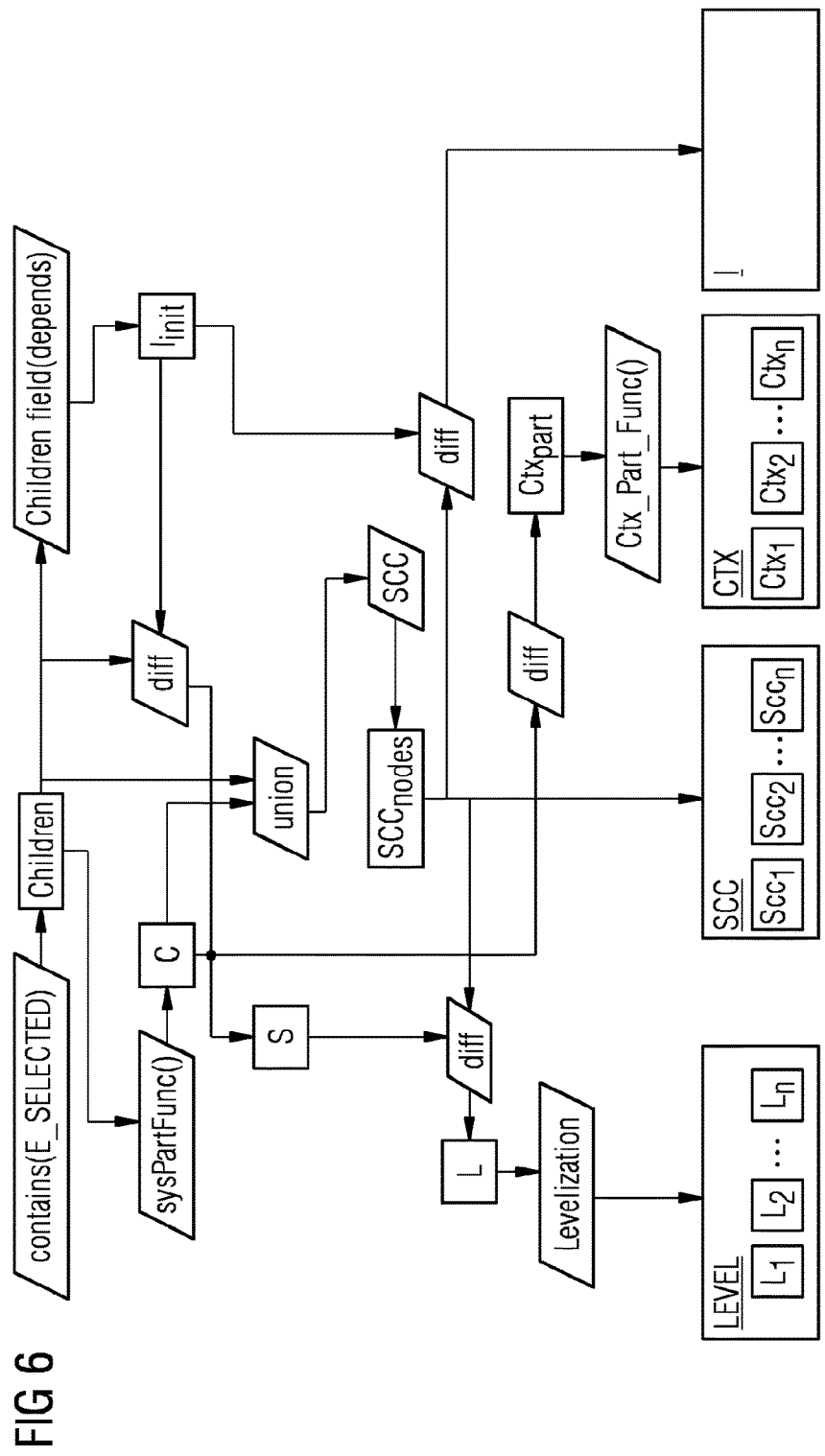
FIG. 6 shows a basic course of a dependency diagnosis process according to the example embodiment shown in FIG. 5.

A schematic of the visual encoding is shown in FIG. 5. Each partition can then follow its own layout rules.

Each partition is visible only if there are nodes which belong to it. Prioritizing the positioning of the nodes first and only then render the edges. The node positioning for each partition is as follows:

Levelized

The nodes belonging to this partition are laid out according to a variation of longest path layering layout [16]. This layout renders nodes and different levels starting from the top-level nodes. The direct dependencies of the top-level nodes are placed in the next level and so on. The only variation is that the bottom-level nodes are rendered to the lowest level at the end of the algorithm. This particular scheme is chosen to aid the task of quickly distinguishing the top-level and bottom-level nodes.

Tangled

The main task of this partition is to give the user an impression of how many "Strongly Connected Components (SCC)" are present in the current sibling set. Each SCC is a group which rendered enclosed by a convex hull. Within each group, a force layout [11] is used to spread the nodes. During force layout calculation, it is necessary to specify the bounds over which the calculation takes place. The SCCs should not overlap, or it would be difficult for the user to distinguish between them. This implies that area demarcated for the tangled nodes have to be subdivided and allotted to each SCC. However, it would be also likely to have more area to be allotted to the group with the most nodes so that smaller SCCs do not rob larger ones of valuable rendering space. Hence, it is subdivided first the given rendering area using a squarified tree-map [10] algorithm weighed by the size of each SCC. Then it is performed the force layout computation within the respective sub-areas.

Independent

The independent nodes do not have an inherent ordering via dependency relations, and hence are just rendered using a typical force layout within the bounds provided.

Context

The two context sections are treated the same with respect to their internal layout. The context nodes serve the purpose of secondary information, which allow the user to understand what the current sibling sets incoming and outgoing dependencies are. Hence, it is useful to employ any grouping mechanisms available, and "lift" the dependencies [12] to the group itself. This reduces the number of edges to be rendered, and the actual edges can be rendered if needed by the user by interacting with the group. The groups are laid out in a flowing layout from left to right as space permits, with the nodes enclosed being indicated. In addition, all the nodes in a group need not be shown, with an ellipsis symbol indicating that there are more nodes to be considered. Within a group, the context nodes are laid out in a grid pattern. Nodes not present in groups are rendered in a grid pattern in the available space.

The rendering of edges is performed after the nodes have been positioned. The edges are de-emphasized by rendering them at a layer below the nodes so that nodes are not crossed. They are further de-emphasized by using low opacity strokes in order not to overwhelm the user with a lot of detail. Dependencies are directed relationships, however the edges are also not drawn with arrows initially to again avoid cluttering the rendering with more marks. When focusing on a node, the arrows appear to reinforce the dependency direction.

B.2.3. Classified Dependencies Viewpoint (CDV) Model

Now it is elaborated on the specific model to be used by CDV. One avoid sophisticated meta-model infrastructure in order to keep the discussion as well as the implementation simple. Instead one use simple binary relations and graphs as proposed by classic reverse engineering tools like [12] and [9].

The following are the model elements:

Entities

E: denote the set of all entities. Any uniquely identifiable object can be considered as an entity. Entities can have multiple attributes, which are key-value pairs with arbitrary data.

T: a set of types, which can be used to identify the different kinds of software artifacts [e.g. "directory", "file", "class"].

Relations

There are three core relations involved in the viewpoint:

contains: A hierarchical relation that indicates whether an entity is contained in another entity [e.g. contains (Dir1, File1)].

depends: The relation that indicates a dependency between two entities. This relation can be composed from lower level relations [e.g. depends:=calls U imports U extends].

typeLessThan (<): This relation is used to indicate an ordering between types in T [e.g. (file<directory)].

Input Functions

The following functions are to be needed for the viewpoint to be instantiated idfunc: E→String, returning a globally unique identifier for every entity nameFunc: E→String, returning a friendly name that can be used for displaying the entity typeFunc: E→T, returning the type of an input entity sysPartFunc: E→S→C, a function that returns given a siblings set, S a set of context nodes, C . . . E, where C ∩ S=∅, containing those entities considered as external dependencies.

(optional) ctxPartFunc: C→{$C_1$, $C_2$, . . . $C_n$}, a function that allows the context nodes to be grouped in order to be collapsed interactively.

Constraints

The following constraints are to be enforced on the entities and relations of the viewpoint:

Unique, Independent Root for contains (C1): There must be only one element which is a root in the hierarchy of entities, and it cannot depend on any other entity. This is required so that the sysPartFunc can reliably calculate the siblings from the top level itself.

Mandatory Attributes (C2): We require for all E,
  e:id=idFunc(e)
  e:name=nameFunc(e)
  e:type=typeFunc(e)

Linear ordering of T (C3): The set of types have to be totally ordered with respect to "<", e.g. (method<class<file<directory). This is used to make explicitly the kind of artifacts that can be hierarchically related.

Types of Context nodes (C4):
  Given $T_s=\{t, t=typeFunc(s); s \in S\}$, and
  $T_c=\{t, t=typeFunc(c); c \in C\}$, then $T_c \subseteq T_s$
  This constraint is used to ensure that the right level of external dependencies is pulled up by the sysPartFunc. E.g. when set S contains directories and folders, it is not wanted to show specific external classes that are being depended on, instead limiting the context nodes to the files containing the said classes.

The hierarchy relation is total, i.e., there are no entities that do not have a place in the hierarchy.

B.2.4. Dependency Classification Algorithm

Now it is presented an algorithm for the classification process. A schematic of the algorithm is provided in FIG. 6.

Inputs:
1. A graph H=<N,E>, where N is a set of nodes and E is a set of tuples (a,b) representing a dependency from a to b, when a,b ∈ N. Each revision or commit is represented by one of such graph. H=⟨E, contains⟩, which hierarchically orders all the entities.
2. The prerequisite viewpoint functions as defined in section "B.2.3." are assumed to be provided.
3. The particular entity $e_{selected}$ Processing:
1. Let Children=contains($e_s$elected), the set of all child nodes of the selected node.
2. Let C=sysPartFunc(Children), containing artifacts external to the current level.
3. Let $I_{init}$=Children−field(depends), which isolates the independent nodes among the child node.
4. Let S=Children−$I_{init}$, which give the siblings involved in a dependency relation.
5. Let A=Children ∪ C be the actual set of nodes to be processed for determining the connected components.
6. Calculate the graph G⟨Vtx, Edg⟩ from ⟨A, depends⟩, which is a dependency graph where all entities in A are vertices in Vtx, and each tuple of the depends is a directed edge in Edg.
7. Find the strongly connected components in G, such that the set SCC=$Scc_1$, $Scc_2$ ... $Scc_n$ is created, where each $Scc_i$ is a connected component. Let $SCC_{nodes}$=$SCC_1$ ∪ $SCC_2$ ... $SCC_n$, a set of all nodes involved in an SCC.
8. Create a set L=S−$SCC_{nodes}$, representing the layered nodes.
9. Let $Ctx_{part}$=C−$SCC_{nodes}$, be a set of context nodes not involved in any cycles.
10. Let I=$I_{init}$−$SCC_{nodes}$, be a set of independent nodes not involved in any cycles.
11. For set L,
    1. Perform the levelization algorithm, and attribute to each node the respective level number.
    2. Group the nodes according to levels, resulting in set LEVEL=$L_1$, $L_2$ ... $L_n$, where i=1 is the bottom-most level and i=n is the top-most level.
12. For context set $Ctx_{part}$, partition the nodes according to ctxPartFunc( ). The partition function produces set CTX=$Ctx_1$, $Ctx_2$ ... $Ctx_n$.
13. For each set $Ctx_i$,
    2. Add $Ctx_i$ as a vertex in Vtx
    3. Add a new edge (a, $Ctx_i$) in G if ∃(a, x) ∈ Edg, x ∈ C. Similarly add edges ($Ctx_i$, a). This allows the rendering of target edges to the group node instead of the individual third party dependency.

Output: The sets according to FIG. 6
1. LEVEL: The set of layered nodes grouped by levels
2. SCC: The set of strongly connected nodes grouped by the respective components
3. CTX: The set of context nodes grouped as needed to reduce clutter
4. I: The set of independent nodes
5. G: The dependency graph containing nodes from the above sets as vertices and dependencies as edges. Note that G also contains vertices that represent groups, and edges to those groups.

B.3. Results and Conclusion

Now the CDV viewpoint is applied to the "Netty" codebase (cf. "Netty" Project Root) [15] to see if it is possible to get results from a real-world codebase (cf. Cycle Detected In "Netty" Transport Sub-Folder).

Regarding the two embodiments, it has been presented a relatively basic scenario with respect to understanding software dependencies can be systematically designed with respect to the tasks a user has in mind. In addition, it has been discussed the specific algorithms involved, and decisions regarding visual encodings and interactions. Thus novel and effective software visualizations can be achieved when following such a viewpoint-oriented approach.

Figure 7:
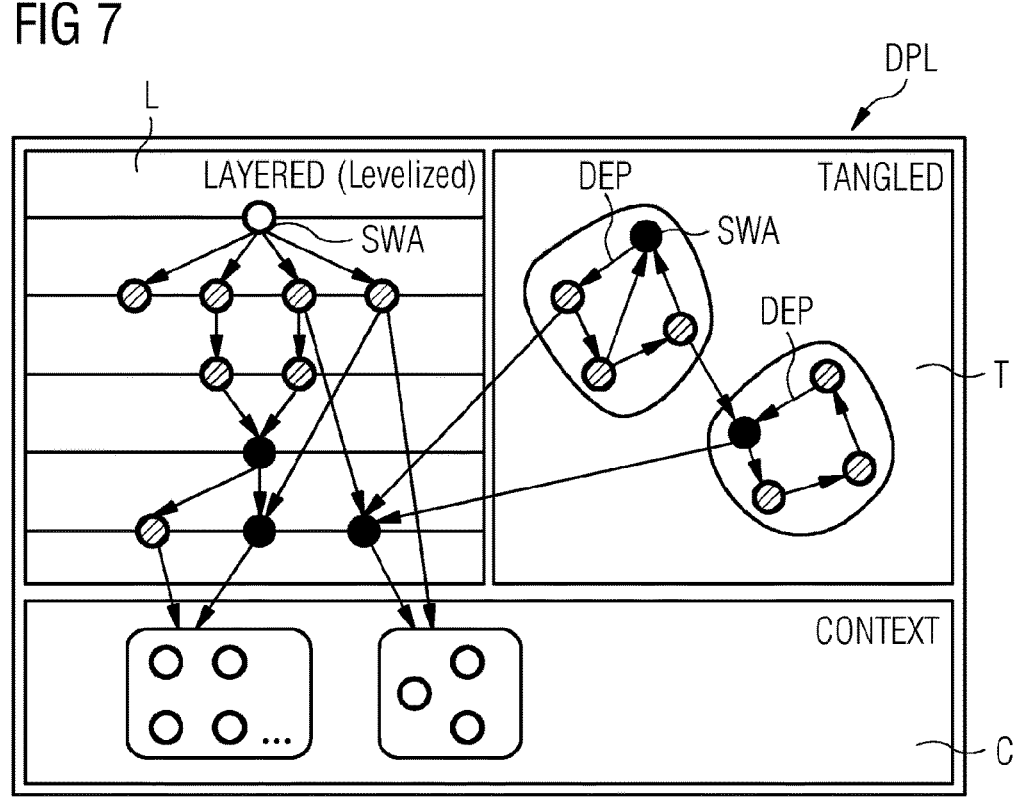
FIG. 7 is based on the representation shown in FIG. 1 and shows a first alternative graphical representation of diagnosed and categorized software artifacts dependencies and related changes in the diagnosed and categorized dependencies with change events on the software artifacts.
Figure 8:
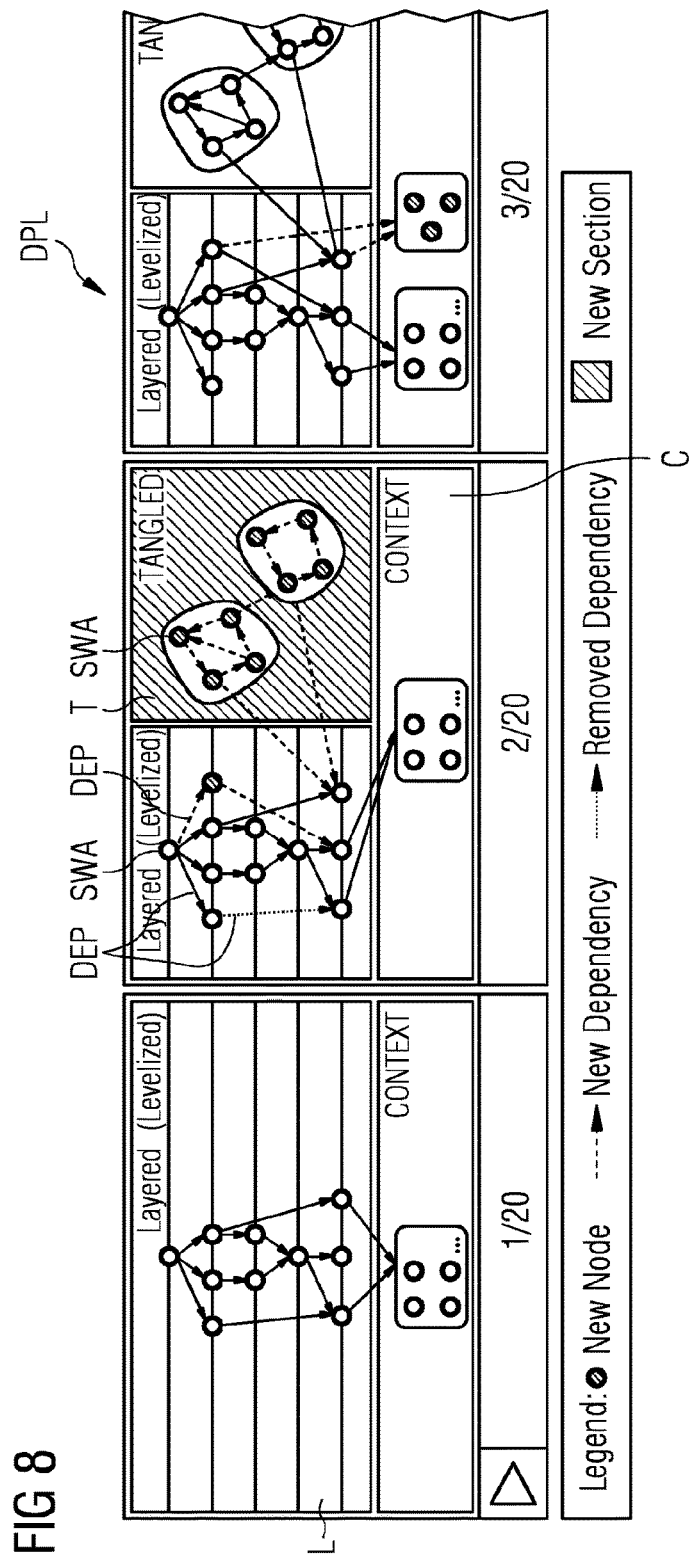
FIG. 8 is based on the representation shown in FIG. 1 and shows a second alternative graphical representation of diagnosed and categorized software artifacts dependencies and related changes in the diagnosed and categorized dependencies with change events on the software artifacts.

FIGS. 7 and 8 depict based on the representation shown in FIG. 1 examples or alternate representations although they work on the same basic idea.

FIG. 7 depicts a first alternative graphical representation of diagnosed and categorized software artifacts dependencies SWA, DEP and related changes in the diagnosed and categorized dependencies DEP with change events on the software artifacts SWA by coloring nodes based on the number of dependencies DEP. In the FIG. 7 the different node colors being used are depicted each as highlighted nodes, non-highlighted nodes or hatched area nodes.

FIG. 8 depicts based on sectional chart a second alternative graphical representation of diagnosed and categorized software artifacts dependencies SWA, DEP and related changes in the diagnosed and categorized dependencies DEP with change events on the software artifacts SWA by a keyframe approach to time bar. Here, instead of animating the changes, each change is kept as a separate diagram, or keyframe that the user can scroll through. At each point, the changes from the previous diagram are highlighted in different colors. In the FIG. 8 the different node, arrow or layout area colors being used for the changes regarding node, arrow and/or layout area are depicted each as hatched area nodes, highlighted layout areas or dotted and dashed line arrows.

REFERENCES

[1] "2014P06309_SdT [1]_Graphviz.pdf" taken from: http://www.graphviz.org/
[2] "2014P06309_SdT [2]_Eclipse Zest.pdf" taken from: http://www.eclipse.org/gef/zest/index.php

[3] Lakos, John. "Large-scale C++ software design." Reading, MA; Chapter 5, Pages 312-324; Addison-Wesley Professional (1996)
[4] NDepend Cheatsheet: http://www.hanselman.com/blog/content/binary/NDepend%20metrics%20placemats%201.1.pdf
[5] "2014P06309_SdT [5]_SHriMP.pdf" taken from: http://thechiselgroup.org/2003/07/06/SHriMP-views/
[6] "2014P06309_SdT [6]_Structure101.pdf" taken from: http://structure101.com/products/
[7] "2014P06309_SdT [7]_Lattix.pdf" taken from: http://www.lattix.com/
[8] "2014P06309_SdT [8]_NDepend.pdf" taken from: http://www.ndepend.com/
[9] Bildhauer, Daniel, and Jürgen Ebert. 2008. "Querying Software Abstraction Graphs." *Working on Query Technologies and Applications for Program Comprehension*
[10] Bruls, Mark, Kees Huizing, and Jarke J Van Wijk. 2000. "Squarified Treemaps." *In Data Visualization* 2000, 33-42. Springer.
[11] Dwyer, Tim. 2009. "Scalable, Versatile and Simple Constrained Graph Layout." *In Computer Graphics Forum*, 28:991-998. 3. Wiley Online Library.
[12] Holt, Richard C. 1998. "Structural Manipulations of Software Architecture Using Tarski Relational Algebra." In *Reverse Engineering*, 1998. Proceedings. Fifth Working Conference on, 210-219. IEEE.
[13] ISO 2011. "ISO/IEC 42010 Systems and Software Engineering—Architecture Description."
[14] Mackinlay, Jack. 1986. "Automating the Design of Graphical Presentations of Relational Information." *ACM Transactions on Graphics* (*TOG*) 5 (2): 110-141.
[15] "Netty Project" 2014 http://github.com/netty/netty/.
[16] Sugiyama, Kozo: "Graph Drawing and Applications for Software and Knowledge Engineers." In 11:64-65. World Scientific, 2002.

What is claimed is:

1. A method for managing a software architecture with various software artifacts of complex cyber-physical systems of different technical domains, the method comprising:
  executing, by a computer processor, a software tool stored in non-transitory computer-readable media to:
    a) extract dependencies of the software artifacts, wherein the dependencies are triggered by revisions or commits,
    b) identifying and categorizing the extracted dependencies of the software artifacts triggered by revisions or commits,
    c) detecting changes in the identified and categorized dependencies as the software architecture is changed by the revisions or commits,
    d) providing relationships between the detected changes in the identified and categorized dependencies and change events on the software artifacts, wherein the change events are caused by enhancing the complex cyber-physical system with new features or fixing defects either found in operation or raised during maintenance of the complex cyber-physical system, and
    e) displaying on a computer display device a representation of the identified and categorized dependencies and the related change events in the identified and categorized dependencies.

2. The method of claim 1, comprising the computer processor executing to software tool to:
  executing a dependency diagnosis process to diagnose for a single revision or commit the software artifacts dependencies, the software artifacts being considered as nodes and at least three node groups provided as per different diagnostic criteria, wherein the computer processor executing the dependency diagnosis process includes:
    (i) receiving as input a graph G=<N,E>, where N is a set of nodes and E is a set of tuples (a,b) representing a dependency from a to b, when a,b ∈N, and
    (ii) outputting, based on the graph G, at least three node sets, the three node sets including:
      (a) a layered node set with layered nodes grouped by levels,
      (b) a tangled node set with tangled nodes grouped due to "strongly connected components", whereby the group encompasses all nodes participating in the tangled node set, and
      (c) a context node set with context nodes grouped for reducing clutter and which do not require detailed dependency information to be represented.

3. The method of claim 1, comprising the computer processor executing to software tool to:
  executing a dependency diagnosis process to diagnose for a single revision or commit the software artifacts dependencies, the software artifacts being considered as nodes and at least three node groups provided as per different diagnostic criteria, wherein the computer processor executing the dependency diagnosis process includes:
    (i) receiving as input a graph H=<N,E>, where N is a set of nodes and E is a set of tuples (a,b) representing a dependency from a to b, when a,b ∈N, and
    (ii) outputting, based on the graph H, at least four node sets, the four node sets including:
      (a) a layered node set with layered nodes grouped by levels,
      (b) a tangled node set with tangled nodes grouped due to "strongly connected components", whereby the group encompasses all nodes participating in the tangled node set,
      (c) an independent node set with independent nodes not having an inherent ordering via dependency relations, and
      (d) a context node set with context nodes grouped regarding a lower context, holding context nodes with only incoming dependencies and an upper context, having context nodes with only outgoing dependencies, for reducing clutter and which do not require detailed dependency information to be represented.

4. The method of claim 2, wherein the nodes, the nodes groups, and the node sets are represented by a graphical representation representing in a single graph for each revision or commit on a user scrollable display via the computer display device, wherein the nodes are displayed as geometric figures, the node sets are displayed as subareas, and the dependencies between the nodes are displayed as arrows.

5. The method of claim 1, wherein a variation of the dependencies over time is represented by a time bar representation.

6. The method of claim 5, wherein the time bar representation includes representation control elements for indicating or marking playback control, revision information, progress of evolution information, and diagnostic events.

7. The method of claim 2, wherein the nodes are colored based on a number of dependencies of each respective node.

8. The method of claim 1, wherein each change in the identified and categorized dependencies is displayed in a separate diagram via the computer display device, in which changes from a previous diagram are highlighted in different colors.

9. A software tool stored in non-transitory computer-readable media and executable by a computer processor to manage software architectures with various software artifacts of complex cyber-physical systems of different technical domains, the software tool comprising:
  a) a source repository analysis program module executable by the computer processor to:
    a1) extract dependencies of the software artifacts, wherein the dependencies are triggered by revisions or commits,
    a2) identify and categorize dependencies of the software artifacts triggered by revisions or commits,
    a3) detect changes in the identified and categorized dependencies as the software architecture is changed by the revisions or commits, and
    a4) provide relationships between the detected changes in the identified and categorized dependencies and change events on the software artifacts, wherein the change events are caused by enhancing the complex cyber-physical system with new features as required by market demands or fixing defects either found in operation or raised during maintenance of the complex cyber-physical system, and
  b) a representation program module executable by the computer processor to display on a computer display device a representation of the identified and categorized dependencies and the change events in the identified and categorized dependencies, which are connected with the source repository analysis system.

10. The software tool of claim 9, wherein the source repository analysis program module is connected to a version control system for the triggering of dependencies by the revisions or commits and to an issue/change event management system for relating the changes in the identified and categorized dependencies with the change events on the software artifacts.

11. The software tool of claim 9, wherein the source repository analysis program module includes representational support system transforming data processed in the source repository analysis program module in a form usable by the representation program module designed as a workspace and interface for a user.

12. The software tool of claim 9, wherein the source repository analysis program module includes an artifact analyzer and an analysis engine forming a first common functional unit executable by the computer processor to perform a dependency diagnosis process to diagnose for a single revision or commit the software artifacts dependencies, the software artifacts being considered as nodes and at least three node groups provided as per different diagnostic criteria, wherein execution of the dependency diagnosis process includes:
  (i) receiving as input a graph G=<N,E>, where N is a set of nodes and E is a set of tuples (a,b) representing a dependency from a to b, when a,b ∈N, and
  (ii) outputting, based on the graph G, to the representation program module at least three node sets including:
    (a) a layered node set with layered nodes grouped by levels,
    (b) a tangled node set with tangled nodes grouped due to "strongly connected components", whereby the group encompasses all nodes participating in the tangled node set, and
    (c) a context node set with context nodes grouped for reducing clutter and which do not require detailed dependency information to be represented.

13. The software tool of claim 9, wherein the source repository analysis program module includes an artifact analyzer and an analysis engine forming a first common functional unit executable by the computer processor to perform a dependency diagnosis process to diagnose for a single revision or commit the software artifacts dependencies, the software artifacts being considered as nodes and at least three node groups provided as per different diagnostic criteria, wherein execution of the dependency diagnosis process includes:
  (i) receiving as input a graph H=<N,E>, where N is a set of nodes and E is a set of tuples (a,b) representing a dependency from a to b, when a,b ∈N, and
  (ii) outputting, based on the graph H, to the representation program module at least four node sets including:
    (a) a layered node set with layered nodes grouped by levels,
    (b) a tangled node set with tangled nodes grouped due to "strongly connected components", whereby the group encompasses all nodes participating in the tangled node set,
    (c) an independent node set with independent nodes not having an inherent ordering via dependency relations, and
    (d) a context node set with context nodes grouped regarding a lower context, holding context nodes with only incoming dependencies and an upper context, having context nodes with only outgoing dependencies, for reducing clutter and which do not require detailed dependency information to be represented.

14. The software tool of claim 12, wherein the representation program module includes a graphical representation generator and a unit supporting representations forming a second common functional unit executable to represent the nodes, the nodes groups, and the node sets in a single graph for each revision or commit on a user scrollable display, wherein the nodes are displayed as geometric figures, the node sets are displayed as subareas, and the dependencies between the nodes are displayed as arrows.

15. The software tool of claim 9, wherein the representation program module is configured to represent a variation of the dependencies over time using a time bar representation.

16. The software tool of claim 15, wherein the time bar representation includes representation control elements for indicating or marking playback control, revision information, progress of evolution information, and diagnostic events.

17. The software tool of claim 12, wherein the representation program module is configured to color-code the nodes based on a number of dependencies of each respective node.

18. The software tool of claim 9, wherein the representation program module is configured to display each change in the identified and categorized dependencies in a separate diagram, and wherein in which changes from a previous diagram are highlighted in different colors.

19. The software tool of claim 9, wherein the representation program module is configured to display a user-scrollable display via the computer display device.

* * * * *